Nov. 20, 1956   W. B. RETZ   2,771,296
CHUCKING MEANS

Filed March 17, 1954   3 Sheets-Sheet 1

INVENTOR
WILLIAM B. RETZ
BY
ATTORNEYS

Nov. 20, 1956  W. B. RETZ  2,771,296
CHUCKING MEANS

Filed March 17, 1954  3 Sheets-Sheet 2

INVENTOR
WILLIAM B. RETZ
BY Mitchell & Bechert
ATTORNEYS

Nov. 20, 1956  W. B. RETZ  2,771,296
CHUCKING MEANS
Filed March 17, 1954  3 Sheets-Sheet 3

INVENTOR
WILLIAM B. RETZ
BY
ATTORNEYS

United States Patent Office 2,771,296
Patented Nov. 20, 1956

2,771,296

CHUCKING MEANS

William B. Retz, Plainville, Conn., assignor to The New Britain Machine Company, New Britain, Conn., a corporation of Connecticut Application March 17, 1954, Serial No. 416,780

20 Claims. (Cl. 279—74)

My invention relates to chucking means and is particularly useful in center-drive lathes, wherein work must be supported in a minimum of axial length, and yet provide positive retention of the work against tool-cutting forces applied at both axial ends of the chuck.

It is an object of the invention to provide improved chucking means of the character indicated.

It is another object to provide improved chucking means wherein two axially spaced sets of jaws are actuated in tandem.

Another object is to provide improved chucking means employing differential means in the application of actuating forces, so as to provide equal application of jaw force at each of a plurality of locations on the work.

Specifically, it is an object to provide a two-row chuck, that is, a chuck having two sets of angularly spaced jaws, with means for differentially actuating the jaws in the respective sets or rows, so as to minimize possible inequality in the application of chucking forces, as when stock diameter may fluctuate as a function of length.

It is a general object to meet the above objects with a structure providing maximum resistance to eccentric location of a chucked piece of work, and at the same time providing maximum tool access at both axial ends of the chucking means, all within a minimum of axial length.

Other objects and further features of novelty and invention will be pointed out or will occur to those skilled in the art from a reading of the following specification in conjunction with the accompanying drawings. In said drawings, which show, for illustrative purposes only, a preferred form of the invention:

Briefly stated, my invention contemplates improved chucking means for supporting a work piece or a length of stock in a central part thereof, so that working operations may proceed simultaneously on both ends of the length of stock. The chucking means comprises essentially a body with axially separated jaws or sets of jaws, so as to clamp the work at axially spaced locations. Means are provided for differentially connecting the actuating means for the separate jaws or sets of jaws, so that, regardless of axial variation of stock or work diameter, the same chucking forces may be applied at both axial locations. The invention is described in connection with a work-rotating chuck and, therefore, the particular structure incorporates certain further features of novelty occasioned by rotation.

Figure 1:
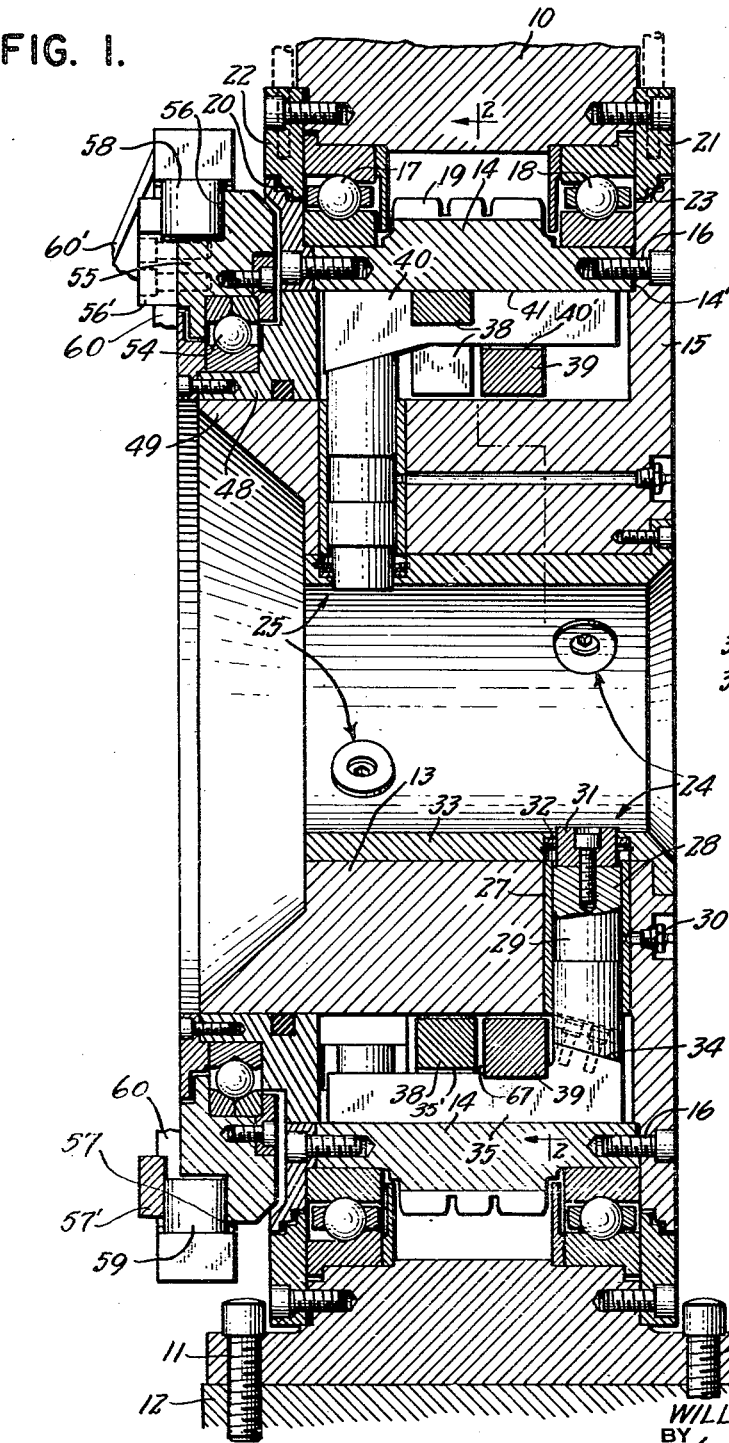
Fig. 1 is a sectional view through chucking means incorporating features of the invention.
Figure 2:
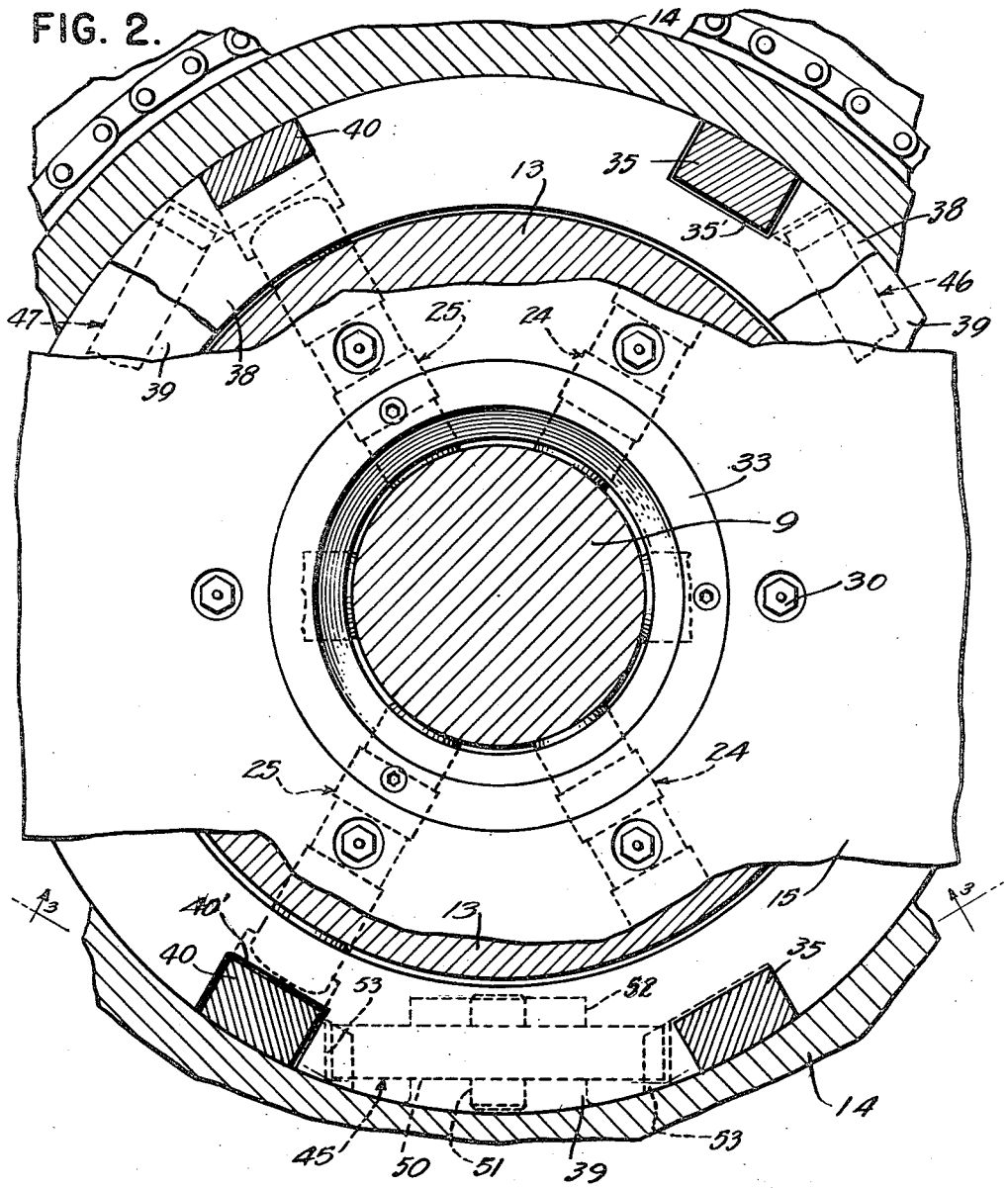
Fig. 2 is a right-end view of the chucking means of Fig. 1, with parts broken away and sectioned in the plane 2—2 of Fig. 1, the chuck being shown in set condition, clamping a piece of stock 9 in position.

Referring particularly to Figs. 1 and 2 of the drawings, my invention is shown in application to work-rotating chucking means contained within a stationary housing 10 bolted at 11 to frame means 12, which may be the bed of a so-called center-drive lathe or the like. The chucking means itself comprises essentially a body with an inner annular member 13 secured to an outer annular member 14, so as to define therebetween an annular space for accommodation of actuating parts. The connection between these two members 13—14, so as to complete the essential body structure, may be made by means of an end plate secured to both members 13—14, but I have shown an outwardly extending flange 15 formed as a part of the inner body member 13, and secured by bolts 16 to the outer body member.

The chuck body may be supported on spaced antifriction bearings 17—18, preferably pre-loaded against each other to assure a tight, non-eccentric support of the work, and the outer surface of the outer body member 14 may be formed with means such as sprocket teeth 19 for direct connection to a drive motor (not shown). At the unflanged end of the outer body member 14, a retaining ring 20 may be bolted, and, to provide the desired pre-load on the bearings 17—18, means such as shims may be accommodated at the interfit between rings 14—20, or at 14' between ring 14 and flange 15, as will be understood. If the ring 20 and the flange 15 extend far enough radially outwardly, they may provide adequate flinger and seal functions for the bearings, but, in the form shown, I so form end-retaining rings 21—22 for the outer bearing rings as to cooperate with ring 20 and flange 15, to provide thin labyrinthian seal passages, as at 23.

In accordance with the invention, the chuck body is provided with means for supporting axially spaced jaws and for differentially actuating these jaws. In the form shown, there are two axially spaced sets of jaws, which I shall term jaws (as at 24) of the right-hand set and jaws (as at 25) of the left-hand set. As will be seen from Fig. 2, the jaws of each set (24—25) are provided in a plurality of three and are equally angularly spaced in their respective radial planes of location. For convenience, I prefer that, as between sets 24—25, there shall also be equal angular staggering of jaw positions, as will appear from Fig. 2. The vertical section of Fig. 1 thus displays one jaw in section for each of the two sets 24—25.

Figure 1A:
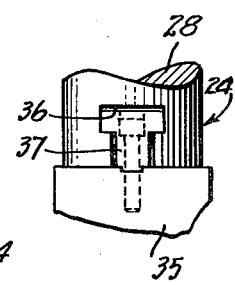
Fig. 1A is an enlarged fragmentary view of a jaw-actuating detail in the structure of Fig. 1.

All jaws are of similar construction, and therefore a description of the jaw shown at 24 in Fig. 1 will suffice. I have provided a sleeve liner 27, as part of the guide bore in the inner body member 13, and the main part of the jaw body 28 is guided for radial reciprocation therein. For lubricating purposes, the body 28 may be reduced at a central location 29, to provide a manifold for distribution of lubricant admitted at fitting 30. The stock-engaging end of the jaw may comprise a foot 31, bolted to the body 28 and sealed as by means 32, contained within or carried by a liner 33, for the work-receiving bore of the inner body 13. At the actuating end of the jaw, body 28 may be formed with a cam slope to coact with the corresponding cam slope 34 of an axially shiftable jaw-actuating means 35; and, in order that actuation inwardly and outwardly may be positive, I show my preference for a dovetailed engagement of the coacting cam surfaces, as displayed in detail in Fig. 1A. Thus, the jaw body 28 may be formed with a dovetailed cam slot 36, in which a dovetailed cam 37 (bolted to the actuating member 35) is received.

In accordance with the invention, the actuating means for the respective sets of jaws 24—25 are essentially independent, connected only by differential means. In the case of circumferentially distributed jaws in each set, it is convenient to tie the actuating members together by means of separate rings, such as the ring 38 associated with the jaws 25 and the ring 39 associated with the jaws 24. The rings 38—39 may, of course, be integrally formed with the cam means engaging the various jaws of the respective sets, but I have shown a separate actuating member 35 for each jaw of the right-hand set of jaws and a separate actuating member 40 for each jaw of the left-hand set 25. The actuating members 35—40 may be elongated bars guided for longitudinal reciprocation on the cylindrical surface 41, constituting the bore of the outer annular body member 14. In order to avoid interference between the actuating members 35 and the ring 38 (connecting the actuating members 40 for the left-hand set of jaws), and to avoid interference between actuating members 40 and ring 39 (connecting the actuating members 35 for the right-hand set of jaws), it is necessary that these rings 38—39 shall be locally cut away or shall locally undulate, as is apparent at clearances 35'—40' in Fig. 2.

In order that the differentially applied actuating forces shall be uniformly distributed, I prefer to apply these forces at a plurality of angularly spaced locations, corresponding to the plurality of jaws in each set. Thus, in Fig. 2, I show at 45—46—47 three different locations for the differential application of actuating forces. Basic actuating thrust is shown derived from a ring 48, common to all locations 45—46—47 and guided for longitudinal reciprocation on an extension 49 of the inner-body member 13; ring 48 may essentially close the otherwise open end of the actuating space between members 13—14.

Figure 3:
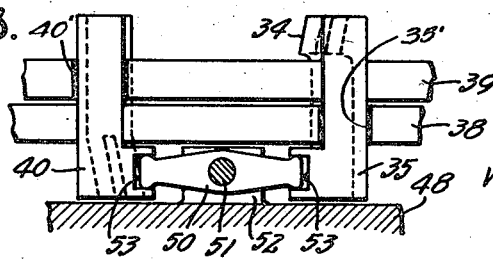
Fig. 3 is an enlarged fragmentary view of certain of the actuating parts of my chucking means, and as viewed generally along the line 3—3 of Fig. 2.

With particular reference to Fig. 3, the differential connection may, at each of the locations 45—46—47, comprise a wobble lever 50 pivoted at 51 to a projection 52 formed as a part of or carried by the ring 48. Suitably formed ends of adjacent actuating members 35—40 for the respective sets of jaws may cooperate with the ends of the wobble lever 50. In the form shown, these ends are recessed, as at 53, and the ends of the wobble lever ride in these recessed portions, thus providing positive jaw actuation for both directions of movement of ring 48.

Figure 5:
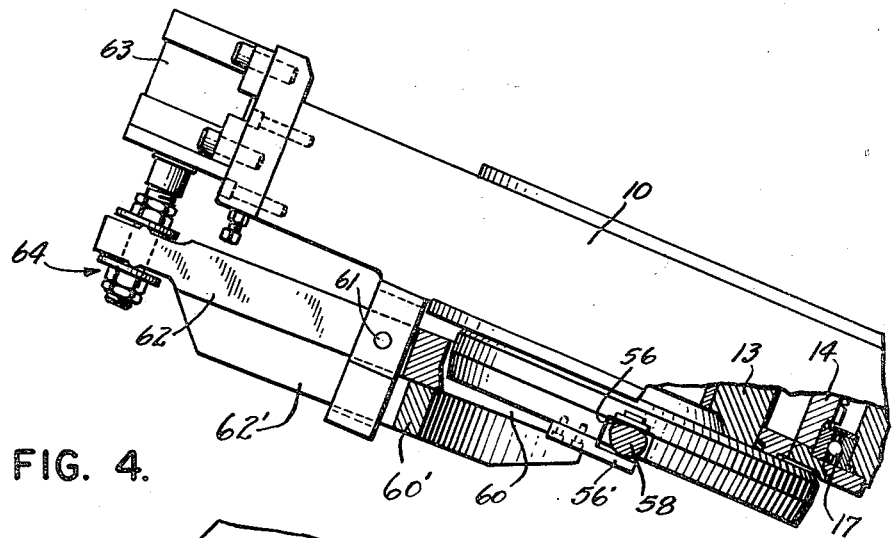
Fig. 5 represents a projection from above the chucking means, as viewed more or less perpendicular to the lines 5—5 of Fig. 4, and partly broken away and in section.
Figure 4:
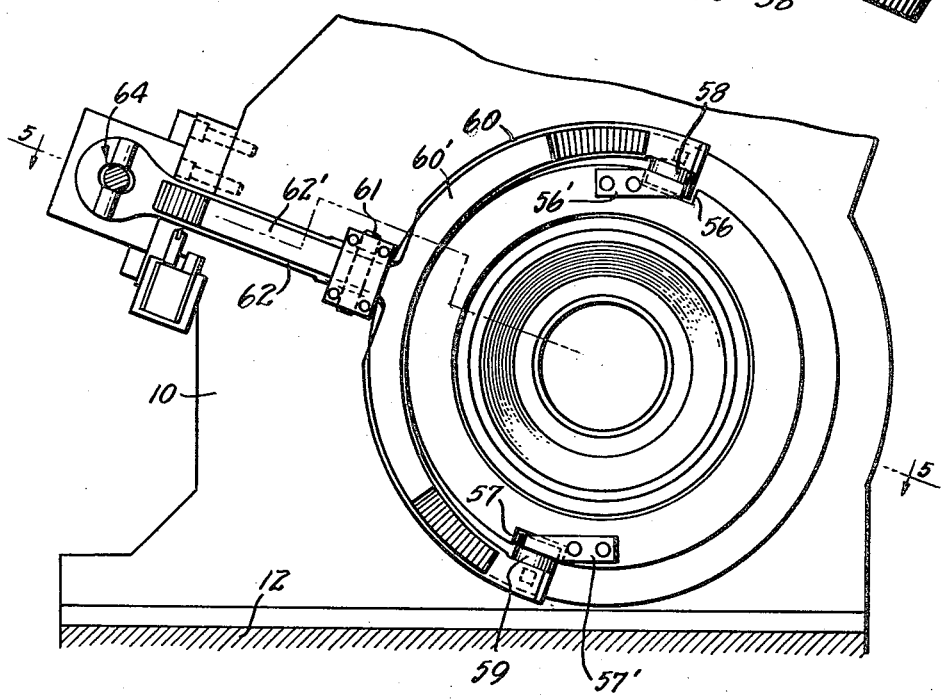
Fig. 4 is a left-end view of the chucking means of Fig. 1, in order to reveal external actuating parts.

To complete the structure for the case of the rotating-chuck assembly shown, the basic actuating mechanism may comprise a non-rotating thrust ring 55 connected to ring 48 through thrust-bearing means 54. In Figs. 4 and 5, the thrust ring 55 is seen to include angularly spaced apart means 56—57 for receiving chuck-actuating thrust, as from the opposed appropriately rounded thrust ends 58—59 of an actuating fork 60 pivoted at 61 to the frame part 10 of the assembly. Conventional means may be employed to actuate the arm 62 of fork 60, and I have shown fluid-pressure operated means 63 connected at 64 to the outer end of arm 62. To strengthen arm 62 and fork 60, I have shown reinforcing webs 62'—60', respectively; and retainer brackets 56'—57' carried by ring 48 provide means for positive retraction of ring 55 (and, therefore, of jaws 24—25) when the chuck is opened.

In use, differential action is achieved in both sets of jaws 24—25 upon thrust actuation of rings 55—48 in a single direction. Axial clearances, as at 67, between rings 38—39, may thus be kept relatively small, limited primarily by the anticipated need for equalizing action, as between the two sets of jaws 24—25. Relatively large jaw-actuating longitudinal displacements are available, considering the limited clearance, as at 67, and considering the restricted overall axial length of the chuck. If the stock 9 being chucked happens to be of larger diameter at the axial location of jaws 24 than at that for jaws 25, jaws 24 will set for a lesser leftward (in the sense of Fig. 1) displacement of ring 39 than will jaws 25 for leftward displacement of ring 38; clearance 67 will in such case be relatively great. If the stock taper should be of opposite sense, the jaws will set for a lesser clearance 67. In either event, however, the differential action will assure equality of jaw-clamping forces as between the respective sets 24—25.

My chucking means will be seen to provide positive location of the work 9 regardless of diameter fluctuations as a function of length. The work is accurately maintained in centered position by means of the spaced large-radius bearings 17—18, pre-loaded to assure an effectively wide-base support. Maximum tool-access is afforded at both axial ends, and the external actuating mechanism adds negligibly to the overall axial length.

While I have described my invention in detail with particular reference to the preferred form shown, it will be understood that modifications may be made within the scope of the invention as defined in the claims which follow.

I claim:

1. Chucking means, comprising a tubular body open at both axial ends and having two axially spaced, generally radially directed bores, two jaws separately guided in each of said bores, axially shiftable jaw-actuating means including a first cam surface cooperating with one of said jaws and a second cam surface cooperating with the other of said jaws, both cam surfaces being inclined in the same direction with respect to the chucking axis, said actuating means including differential connections to said jaws, whereby, upon actuation of said actuating means in a single axial direction relative to said body, both axially separate jaws may be actuated in unison.

2. Chucking means comprising a body having a plurality of generally radially directed bores, separate chucking jaws guided by said bores for generally radial chucking action, first actuating means for one of said jaws, second actuating means for the other of said jaws, and means within said body and including a differential connection to both said actuating means for simultaneously actuating both said jaws with equalized force application.

3. Chucking means, comprising a body having a plurality of generally radially directed bores, separate chucking jaws guided for generally radial movement in said bores, first axially shiftable actuating means including cam means coacting with one of said jaws, second axially shiftable actuating means including cam means coacting with another of said jaws, both said cam means being inclined in the same sense with respect to the axis of said chucking means, and means including a differential connection to both of said actuating means for actuating both said jaws with equalized force application.

4. Chucking means, comprising a body having two axially spaced, generally radially directed bores, separate jaws guided by said bores, separate actuators for each of said jaws, said actuators being guided for axial displacement and each including cam means cooperating with its particular jaw to produce a component of radial jaw displacement upon axial actuator displacement, all said cam means being inclined in the same sense with respect to the axis of said chucking means, and means including a differential connection between said actuators for actuating said jaws in unison.

5. Chucking means, comprising a body having a first set of generally radially directed bores and a second set of generally radially directed bores, said sets being axially spaced, separate jaws in said bores, a first plurality of actuating means including cam means cooperating with all jaws in said first set, a second plurality of actuating means including cam means cooperating with all jaws in said second set, and means including separate differential connections to corresponding axially spaced pairs of said actuating means for differentially applying chucking force to the corresponding axially spaced pairs of said chucking jaws.

6. Chucking means, comprising a body having a first set of radially directed bores in a first radial plane and having a second set of radially directed bores in a second radial plane spaced from said first radial plane along a chucking axis, separate jaws in said bores, said body having a central work-receiving bore into which said jaws project, a first actuator guided for axial movement with respect to said body and including cam means cooperating with all jaws in said first set, a second actuator guided for axial movement with respect to said body and including cam means cooperating with all jaws in said second set, and means symmetrical about said axis for differentially applying actuating forces to said actuators.

7. Chucking means, comprising a body having a first set of radially directed bores in a first radial plane and having a second set of radially directed bores in a second radial plane spaced from said first radial plane, separate jaws in said bores, said body having a central work-receiving bore into which said jaws project, a first actuator guided for axial movement with respect to said body and including cam means cooperating with all jaws in said first set, a second actuator guided for axial movement with respect to said body and including cam means cooperating with all jaws in said second set, and means for differentially applying actuating forces to said actuators, both said cam means sloping in the same sense, whereby both actuators are moved in the same direction to produce a given jaw actuation, thereby minimizing the need for axial clearance between said actuators.

8. Chucking means, comprising a body having a central work-receiving bore and having axially spaced sets of generally radially directed jaw-guiding bores, separate jaws guided in said bores, first actuating means comprising a ring axially shiftable with respect to said body and carrying separate cams for the separate jaws of said first set, a second ring carrying separate cams for the separate jaws of said second set, a chuck-actuating ring guided for axial displacement with respect to said body, and means differentially connecting said last-defined ring in actuating relationship with each of said first two above-mentioned rings.

9. Chucking means, comprising a body having a central work-receiving bore and having a first generally radially directed jaw-guiding bore axially separated from a second generally radially directed jaw-guiding bore, separate jaws in said bores, said body further comprising a cylindrical reaction surface concentric with the work-receiving bore and overstanding both said jaw-guiding bores, a first jaw actuator extending longitudinally and slidably along said cylindrical surface and including cam means cooperating with one of said jaws to produce jaw actuation upon axial movement thereof, a second jaw-actuator longitudinally slidable on said cylindrical surface and including cam means cooperating with the other of said jaws, a common actuating ring guided by said body for axial displacement, and means differentially connecting said ring to both said actuators.

10. Chucking means, comprising an inner body removably connected to an outer body and defining therebetween an annular space for actuating parts, said inner body having a central work-receiving bore and having first and second axially spaced sets of generally radially directed jaw-receiving bores, jaws in said bores, said outer body having an inner cylindrical guide surface, a first ring guided by said surface and including separate cams coacting with the jaws of one of said sets, a second ring guided by said surface and including separate cams coacting with the separate jaws of the other set, means differentially connecting said rings with regard to axial movement along said surface, and a common ring guided for axial movement with respect to one of said inner and outer bodies and directly connected to said differential-connection means.

11. Chucking means according to claim 10, in which the jaws of one set are in angularly staggered relation with the jaws of the other set, whereby a jaw of one set may be said to be angularly adjacent a jaw of another set, to define paired jaws of both sets.

12. Chucking means according to claim 11, in which said differential connecting means comprises separate differential connections between said common ring and each said pair of jaws of both sets.

13. Chucking means, comprising a first annular body member with a radially extending flange at one end and having first and second axially spaced sets of generally radially directed jaw-guiding bores, jaws in said bores, a second annular body member radially outside said first body member and secured at one end to said flange, first and second actuating rings guided on the inner surface of said second body member and respectively including cams coacting with the respective sets of jaws, said cams being inclined in the same sense with respect to the axis of the chucking means, a common actuating ring guided between said body members at the other end of said chucking means, and means differentially connecting said common actuating ring to both said other rings.

14. Chucking means according to claim 13, and bearing means carried by said outer body for supporting said chucking means in rotation.

15. Chucking means according to claim 14, in which said bearing means comprises two axially spaced sets of antifriction bearings.

16. Chucking means according to claim 14, in which said bearing means comprises two axially spaced bearings, and in which the outer surface of said outer body member is formed for direct engagement with driving means for driving said chucking means in rotation.

17. Chucking means according to claim 13, in which said common actuating ring includes a first ring member differentially connected to said actuating rings and therefore rotatable with said chucking means, and a second thrust application ring connected to said first ring member through thrust bearing means and held against rotation with rotation of said chucking means.

18. Chucking means according to claim 17, in which said thrust ring is provided at a plurality of angularly spaced locations with means for receiving thrust forces.

19. Chucking means according to claim 13, in which the engagement of said cams with said jaws comprises interfitting dovetailed parts, whereby said jaws may be positively actuated inwardly and outwardly.

20. Chucking means, comprising a body having a plurality of generally radially directed bores, separate sets of chucking jaws guided by said bores for generally radial chucking action, separate actuating means for each of said sets of jaws, and means including a plurality of angularly spaced differential connections to both said actuating means for simultaneously actuating all of said jaws with equalized force application.

References Cited in the file of this patent

UNITED STATES PATENTS

| 804,904 | Vaught | Nov. 21, 1905 |
| 1,345,583 | Church | July 6, 1920 |
| 1,400,306 | Miller | Dec. 13, 1921 |
| 1,547,706 | Whitmore et al. | July 28, 1925 |
| 2,143,010 | Imblum | Jan. 10, 1939 |